(12) United States Patent
Schipmann et al.

(10) Patent No.: US 11,370,466 B2
(45) Date of Patent: Jun. 28, 2022

(54) DEVICE FOR HORIZONTAL, CENTERING RESTORATION OF A COUPLING SHAFT

(71) Applicant: Voith Patent GmbH, Heidenheim (DE)

(72) Inventors: Ralf Schipmann, Neuendorf-Sachsenbande (DE); Erik Johannsen, Braunschweig (DE)

(73) Assignee: Voith Patent GmbH, Heidenheim (DE)

( * ) Notice: Subject to any disclaimer, the term of this patent is extended or adjusted under 35 U.S.C. 154(b) by 536 days.

(21) Appl. No.: 16/344,683

(22) PCT Filed: Oct. 20, 2017

(86) PCT No.: PCT/EP2017/076873
§ 371 (c)(1),
(2) Date: Jan. 14, 2020

(87) PCT Pub. No.: WO2018/077752
PCT Pub. Date: May 3, 2018

(65) Prior Publication Data
US 2020/0055529 A1    Feb. 20, 2020

(30) Foreign Application Priority Data
Oct. 28, 2016   (DE) .................... 102016120639.3

(51) Int. Cl.
*B61G 7/08* (2006.01)
*B61G 7/12* (2006.01)
(Continued)

(52) U.S. Cl.
CPC ................ *B61G 7/08* (2013.01); *B61G 7/12* (2013.01); *F16D 7/06* (2013.01); *B61D 15/06* (2013.01);
(Continued)

(58) Field of Classification Search
CPC ....... B61G 7/08; B61G 7/12; F16D 2023/123; F16D 23/12; F16D 23/14; F16D 43/206; F16D 7/08; F16D 7/06
See application file for complete search history.

(56) References Cited

U.S. PATENT DOCUMENTS

| | | | | |
|---|---|---|---|---|
| 684,245 | A * | 10/1901 | Hinson | ..................... B61G 9/10 |
| | | | | 213/38 |
| 1,638,957 | A * | 8/1927 | Pitt | ......................... F16C 19/54 |
| | | | | 384/459 |

(Continued)

FOREIGN PATENT DOCUMENTS

| | | |
|---|---|---|
| CN | 101857041 A | 10/2010 |
| DE | 24 19 184 A1 | 11/1975 |

(Continued)

*Primary Examiner* — Zachary L Kuhfuss
(74) *Attorney, Agent, or Firm* — Cesari and McKenna, LLP

(57) ABSTRACT

The invention relates to a device (1) for the horizontal re-centering of a coupling shaft, particularly a central buffer coupling of a track-guided vehicle, wherein the device (1) comprises a first rotating body (3) and a second rotating body (4) which is rotatable relative to the first rotating body (3), wherein the device (1) is designed to produce the force necessary to generate a restoring torque acting on the coupling shaft by the rotating of the two rotating bodies (3, 4) relative to each other.

22 Claims, 8 Drawing Sheets

Figure 1A:
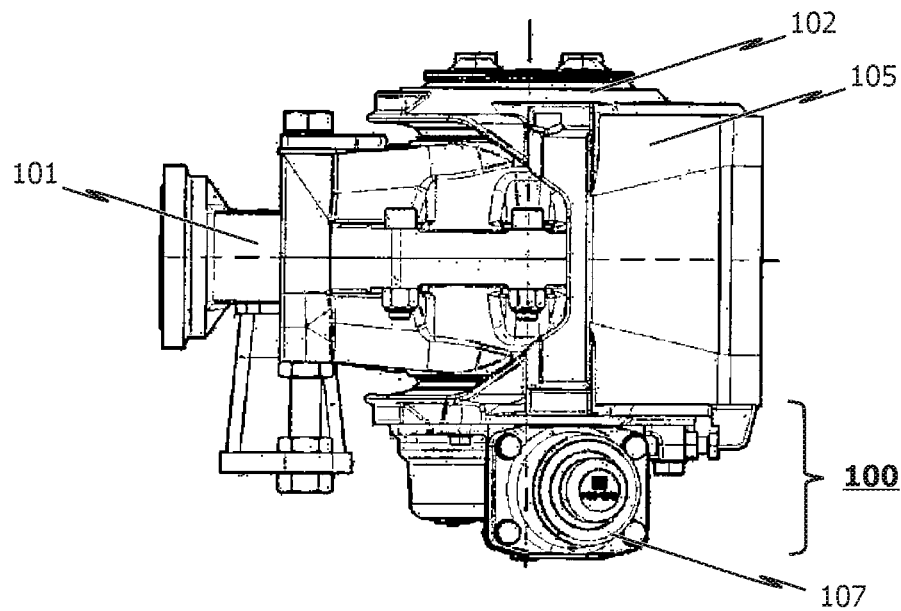

(51) Int. Cl.
*F16D 7/06* (2006.01)
*B61D 15/06* (2006.01)
*B61G 3/16* (2006.01)
*B61G 5/04* (2006.01)
*B61G 7/14* (2006.01)

(52) U.S. Cl.
CPC .................. *B61G 3/16* (2013.01); *B61G 5/04* (2013.01); *B61G 7/14* (2013.01)

(56) References Cited

U.S. PATENT DOCUMENTS

| | | | |
|---|---|---|---|
| 3,484,000 A | | 12/1969 | Cope |
| 3,926,317 A | * | 12/1975 | Scharfenberg ........... B61G 7/12 213/20 |
| 4,013,175 A | * | 3/1977 | Klein ...................... B61G 7/12 213/20 |
| 4,289,247 A | * | 9/1981 | Brand ..................... B61G 7/12 213/19 |
| 2005/0121404 A1 | * | 6/2005 | Sprave .................... B61G 7/12 213/75 R |

FOREIGN PATENT DOCUMENTS

| | | |
|---|---|---|
| DE | 2419184 A1 | 11/1975 |
| DE | 24 45 460 A1 | 4/1976 |
| DE | 2445460 A1 | 4/1976 |
| DE | 28 22 104 A1 | 11/1979 |
| DE | 2822104 A1 | 11/1979 |
| DE | 1 810 593 B2 | 4/1981 |
| DE | 1810593 B2 | 4/1981 |
| DE | 43 28 811 C1 | 10/1994 |
| DE | 4328811 C1 | 10/1994 |
| DE | 195 26 504 C1 | 7/1996 |
| DE | 195 26 504 C1 | 7/1996 |
| DE | 297 13 253 U1 | 11/1998 |
| DE | 201 20 581 U1 | 6/2003 |
| DE | 20 2009 012 949 U1 | 12/2009 |
| DE | 10 2009 021 873 A1 | 11/2010 |
| DE | 10 2009 021874 A1 | 11/2010 |
| DE | 20 2012 100064 U1 | 2/2012 |
| EP | 1 538 057 A1 | 6/2005 |
| EP | 1 719 686 A1 | 11/2006 |
| EP | 2 522 560 A1 | 11/2012 |
| RU | 115426 U1 | 4/2012 |

* cited by examiner

DEVICE FOR HORIZONTAL, CENTERING RESTORATION OF A COUPLING SHAFT

CROSS REFERENCE TO RELATED APPLICATIONS

This application is the National Stage of International Application No. PCT/EP2017/076873, filed on Oct. 20, 2017, which claims priority to German Application No. 10 2016 120 639.3, filed on Oct. 28, 2016. The contents of both applications are hereby incorporated by reference in their entirety.

The invention relates to a device for the horizontal re-centering of a coupling shaft, in particular a central buffer coupling of a railway vehicle.

Such re-centering devices are known for example from DE 1 810 593 B2, DE 24 19 184 A1, DE 28 22 104 A1 and DE 24 45 460 A1.

DE 1 810 593 B2 specifically shows a horizontal re-centering device for a central buffer coupling pivotably affixed to a railway vehicle by means of a coupling shaft which has a guide following the pivoting motion of the coupling shaft around its vertical pivot axis. Oblique thrust faces are arranged on the guides symmetrically to the longitudinal axis of the coupling shaft. Spring-loaded pressure means which are supported on the housing for the coupling shaft and effect the horizontal re-centering, each have a respective return spring, a roller-bearing pressure transmitting member acted on by the return spring and cooperating with one of the thrust faces, and a stop member which limits the movement of the pressure transmitting member, wherein each thrust face is associated with a pressure means.

DE 24 19 184 A1 discloses a further device for the horizontal re-centering of a central buffer coupling for railway vehicles, in which a respective pressure spring is arranged symmetrically on both sides of the coupling axis, each abutting a sliding block guided in a housing. The sliding blocks are respectively pressed against a guide that follows the horizontal pivoting movement of the coupling shaft about the vertical pivot axis of the central buffer coupling by an associated vertical axis-support roller via the force of the preloaded pressure springs. The support rollers form a respective symmetrical pair of support rollers mounted in the guide on both sides of the coupling axis, the two support rollers of which are each at different distances from the coupling axis, wherein the axes of the support rollers are situated on a circle concentric to the vertical pivot axis of the central buffer coupling. In the central buffer coupling's center position, the support rollers of each support roller pair abut against a sliding surface of the sliding block, which is approximately triangular when viewed from above, wherein a guide shaft is arranged on each sliding block which passes through the housing and is guided in same. The centering device is continually operative during normal operation; i.e. including navigating curves or turn-outs, such that the sliding surfaces of the sliding blocks, which are pressed against the support rollers by the pressure springs, are subject to relatively high wear by the pivoting movement of the central buffer coupling. Coupling while in a curve is only possible with difficulty or not at all because the resetting forces of the pressure springs counteract the manually effected outward pivoting of the central buffer coupling to be coupled.

Known from DE 28 22 104 A1, however, is a device which solves the disadvantages of the aforementioned device by the re-centering being designed so as to be disengageable and being disabled when re-centering is unnecessary or unwanted. A respective double-armed pivot lever is to that end articulated to each of the guide shafts of the sliding blocks, one lever arm of which is directly or indirectly connected to a lifting cylinder and the other lever arm supported against the housing, wherein the sliding blocks can be brought into a position in which the support rollers have no contact with the sliding blocks during a horizontal pivoting movement of the coupling shaft and the coupling shaft can thus be freely pivoted by the pivoting of the pivot levers via actuated or remote-controllable lifting cylinders without being loaded by the pressure spring.

DE 24 45 460 A1 discloses a device for the controllable re-centering of central buffer couplings, wherein a cam operatively connected to the coupling shaft extends between two limit stops arranged in the horizontal path of the cam so as to be displaceable by pneumatically, hydraulically or electrically operating actuating means, wherein the full horizontal lateral deflection of the coupling rod is provided at one end position of the limit stops whereas the cam is clamped between the stops and the coupling shaft thus fixed in the center position in the other end position of the cam. What this device achieves is the coupling shaft remaining fixed and largely vibration-free in the center position during travel yet this center position locking on the other hand not being obtained at the expense of excessive deflecting forces being applied during normal operation.

DE 43 28 811 C1 discloses a central buffer coupling with a horizontally pivotable front coupling shaft which bears the coupling head and which, when not in use, can be manually pivoted together with same behind the front end of the railway vehicle and locked after a fixing device being released.

Furthermore known from DE 195 26 504 C1 is a central buffer coupling for railway vehicles which has a rear link arm articulated to and supported on the vehicle side as well as a front link arm articulated thereto by an articulated joint with a vertical hinge pin bearing the coupling head. A locking member connected to the articulated arms is designed as a rotatably mounted locking bolt in drive connection with a drive supported on the rear articulated arm. The drive has a drive element freely movable between stops for pivoting the front link arm. The front link arm can thus be pivoted in and out with the coupling head by a motor and can be brought behind the front end of the vehicle when not in use to reduce the hazard potential.

U.S. Pat. No. 3,484,000 A discloses a central buffer coupling having a device for the horizontal re-centering of a coupling shaft. Similar to the design of the previously discussed DE 28 22 104 A, the pivoting of the coupling shaft also ensues here by means of a pivot lever arranged on both sides of the coupling shaft actuated by a pneumatic lifting cylinder. This horizontal re-centering device provides for the coupling shaft to be positionable into any position of the designated horizontal range of pivoting. In the central buffer coupling known from the U.S. Pat. No. 3,484,000 A prior art, the pivoting of the coupling shaft ensues by means of a pivot lever arranged on both sides of the coupling shaft which are actuated by a pneumatic lifting cylinder.

All of the above-discussed solutions employ a center resetting which requires a relatively large amount of space which, however, is often not available in the interface region between the coupling shaft and the vehicle body or the undercarriage of the track-guided vehicle respectively.

The invention is thus based on the task of specifying a device for the horizontal re-centering of a coupling shaft which, due to its compact construction, only takes up a relatively small amount of space.

The invention solves this task by the subject matter of independent claim 1, whereby advantageous further developments of the inventive horizontal re-centering device are indicated in the dependent claims.

It is accordingly provided in particular for the inventive horizontal re-centering device to comprise a first rotating body as well as a second rotating body which is rotatable relative to the first rotating body, wherein the device is designed to produce the force necessary to generate a restoring torque acting on the coupling shaft by the rotating of the two rotating bodies relative to each other. Doing so thus circumvents a structure in which as is customary in the prior art the force necessary to produce the restoring torque is generated in the plane in which it is able to directly effect a torque. This in turn results in the inventive solution being able to reduce the size, the components and the weight.

In one possible realization of the solution according to the invention, it is conceivable for the first and second rotating body to be components of a thrust bearing device, wherein the thrust bearing device is then designed to generate a torque to act on the coupling shaft at least when needed. It is further conceivable for the thrust bearing device to be designed to support the coupling shaft so as to be horizontally pivotable relative to a supporting structure.

Doing so allows integrating all the components necessary for the horizontal re-centering of the coupling shaft into one thrust bearing by means of which the coupling shaft is supported so as to be horizontally pivotable relative to the vehicle body of the track-guided vehicle. This enables the re-centering device to be of particularly compact construction of only relatively small additional constructed space.

One embodiment of the inventive solution provides for the thrust bearing device, or the horizontal re-centering device respectively, to be designed to generate a torque acting on the coupling shaft at least when the coupling shaft is horizontally deflected relative to a fixed or definable center position. It is thereby advantageous for a corresponding restoring torque to be generated up to a predefinable lateral angle of deflection of e.g. 15° to 20° relative to the center position of the coupling shaft, whereby no (further) restoring torque is generated at larger deflections.

One preferential implementation of the inventive device provides for at least parts of the first and second rotating body to be of circular cylindrical configuration and be coaxially arranged with one another such that the second rotating body is at least partially accommodated by the first rotating body. The device according to this implementation moreover comprises a cam roller system having at least two cam rollers and preferably exactly three cam rollers. The cam rollers of the cam roller system are rotatably supported via the second rotating body and radially project from the second rotating body such that they rest upon a face of the first rotating body, wherein the rotating bodies are rotatable relative each other about a vertical axis via the cam rollers of the cam roller system.

In this preferential implementation, the face of the first rotating body serves as a race for the cam rollers of the cam roller system. The race and the cam rollers of the roller system thereby cooperate to at least some extent such that upon the rotating of the first rotating body relative to the second rotating body, the second rotating body is moved along the vertical axis relative to the first rotating body. Particularly provided in conjunction hereto is for the race and the cam rollers to cooperate to at least some extent such that the second rotating body moves at least partially out the first rotating body along the vertical axis relative to said first rotating body when, starting from an initial state of the device, in which the rotating bodies are not rotated relative each other, the rotating bodies are at least rotated relative to each other by a predefined or definable angular amount.

It is thereby particularly conceivable for the race; i.e. the face of the first rotating body on which the cam rollers of the cam roller system rest, to comprise first regions having a first race depth in at least some areas and further second regions of a second race depth in at least some areas, wherein the first race depth is greater than the second race depth, and wherein the depth of the race preferably steadily transitions from the first race depth to the second race depth in a transition region between a first region and a second region. The respective cam rollers of the cam roller system are thereby preferably arranged at least partly in a first region of the race in the initial state of the device.

A further implementation of the inventive device provides for the first rotating body to preferably be designed as a first bearing member, particularly in the form of a bearing disk, and for the second rotating body to preferably be designed as a second bearing member, particularly in the form of a bearing disk, and for the horizontal re-centering device to further comprise a rolling body arrangement of at least one rolling body and preferably a plurality of rolling bodies which is/are at least partially arranged between the first rotating body and the second rotating body such that the rotating bodies can rotate relative to one another around a vertical axis via the at least one rolling body.

When, for example, the device for horizontal re-centering is formed in a thrust bearing device, it is thus conceivable for the thrust bearing device to comprise a first bearing member as well as a second bearing member vertically spaced from the first bearing member, whereby said bearing members are each in particular designed in the form of a bearing disk. Furthermore preferably provided is a rolling body arrangement having at least one rolling body and preferably a plurality of rolling bodies, wherein the at least one rolling body or plurality of rolling bodies is/are at least partially arranged between the first bearing member and the second bearing member such that the two bearing members bodies can rotate relative to one another around a vertical axis via the at least one rolling body.

A race, in particular in the form of a groove, is preferably provided in the first rotating body and/or in the second rotating body in order to at least partially guide the at least one rolling body about the vertical axis relative to the second rotating body upon rotation of the first rotating body.

According to one preferential implementation of the inventive solution, the race(s) and the at least one rolling body cooperate to at least some extent such that a vertical distance between the rotating bodies varies upon rotation of the first rotating body relative to the second rotating body. It is thus of particular advantage for the races(s) and the at least one rolling body to cooperate to at least some extent such that a vertical distance between the rotating bodies increases when, starting from an initial state of the bearing device, in which the rotating bodies are not rotated relative each other, the rotating bodies are rotated at least by a predefined or definable angular amount of for example 15° to 20°.

According to one implementation of the latter aspect, it is provided for the race(s) to comprise at least one first region of a first race depth and at least one further second region of a second race depth, wherein the first race depth is greater than the second race depth, and wherein the race depth preferably steadily and preferably continually transitions at the same gradient from the first race depth to the second race depth in a transition region between the at least one first region and the at least one second region. In this implementation of the inventive solution, it is advantageous for the at least one rolling body to be at least partly arranged in the at least one first region of the race(s) in the initial state of the horizontal re-centering device.

A further aspect of the present invention provides for the coupling shaft to be at least substantially rotationally fixed to the first rotating body, whereby although the first rotating body is essentially rotatable about the vertical axis relative the supporting structure, it is not or at least not substantially mounted so as to be vertically movable relative to the supporting structure.

In the same way, the second rotating body is to preferably be vertically movable relative the supporting structure but not, however, or at least not substantially mounted so as to be horizontally rotatable relative to the supporting structure.

According to a further aspect of the present invention, the horizontal re-centering device is provided with a pressurized or pressurizable punch assembly which is in particular allocated to the second rotating body and is supported against the supporting structure, whereby in particular a normal force acting particularly in the direction of the first rotating body can be introduced into the second rotating body via said pressurized or pressurizable punch assembly. The punch assembly is preferably configured such that an amount of normal force introduced or introducible into preferably the second bearing member via said punch assembly is adjustable, and namely in such a way that the amount of normal force introduced via the punch assembly into particularly the second bearing member can in particular assume the value of zero.

According to a further aspect of the invention, the rolling body arrangement comprises at least two rolling bodies and a cage structure allocated to the at least two rolling bodies for the forced guiding of said at least two rolling bodies.

A guide structure is preferably further provided for guiding and/or limiting cage structure movement relative to the first and second rotating body. Conceivable in this context is for the guide structure to comprise at least one guide body eccentrically arranged relative to the vertical axis and connecting the rotating bodies together. The guide body is thereby preferably supported so as to be rotationally movable relative to the first rotating body and/or relative to the second rotating body.

The invention not only relates to a re-centering device of the above-described type but also to a central buffer coupling, in particular for track-guided vehicles, wherein said central buffer coupling comprises such a device for re-centering.

Moreover, the invention also relates to a central buffer coupling which is connected or connectable to a vehicle body of the track-guided vehicle by means of a linkage comprising a thrust bearing and wherein the device for re-centering a coupling shaft of the central buffer coupling is integrated into said linkage.

The following will reference the accompanying drawings in describing the invention in greater detail.

Figure 1B:
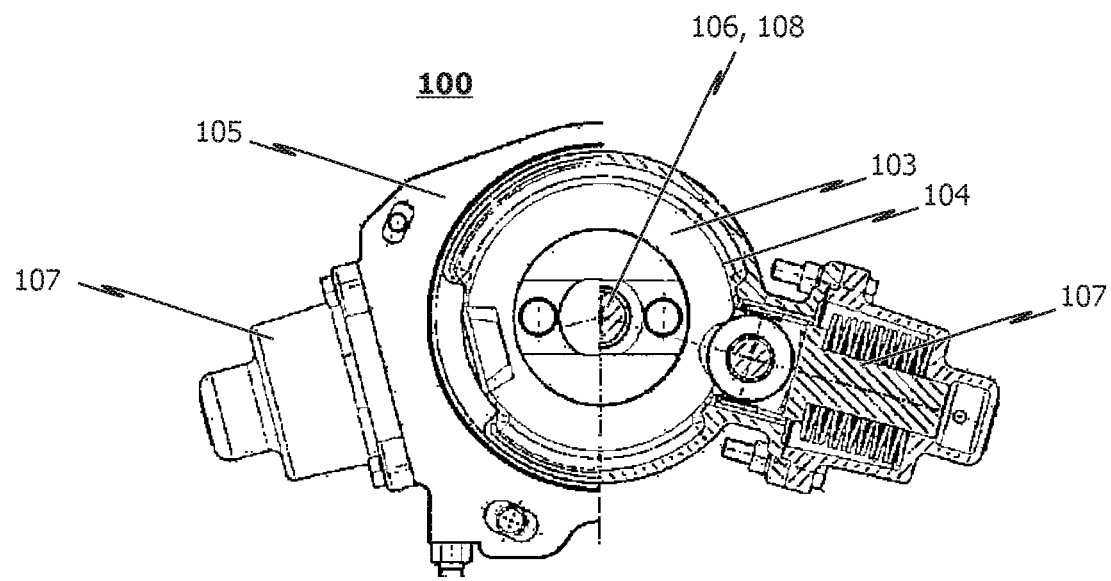
Figure 2:
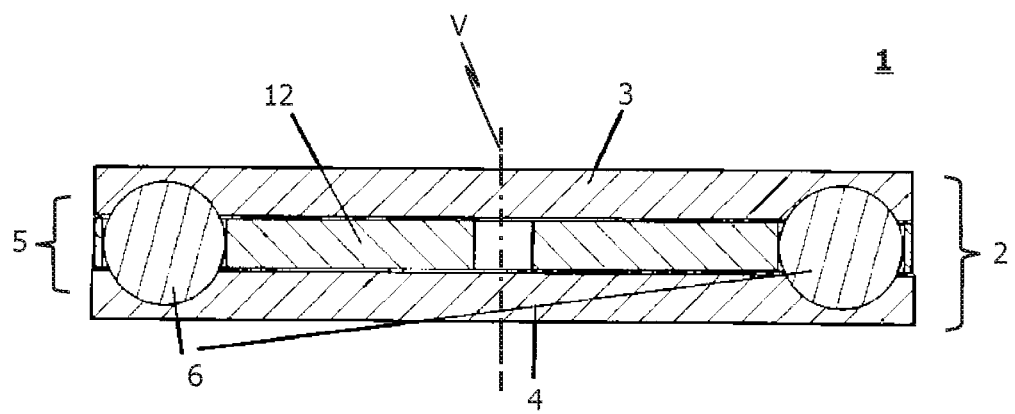
Figure 3:
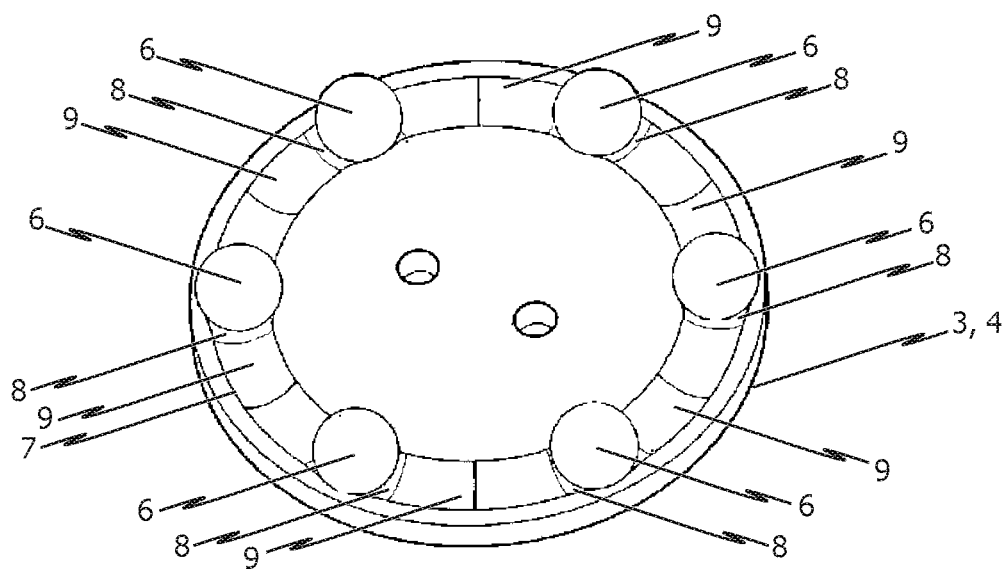
Figure 4:
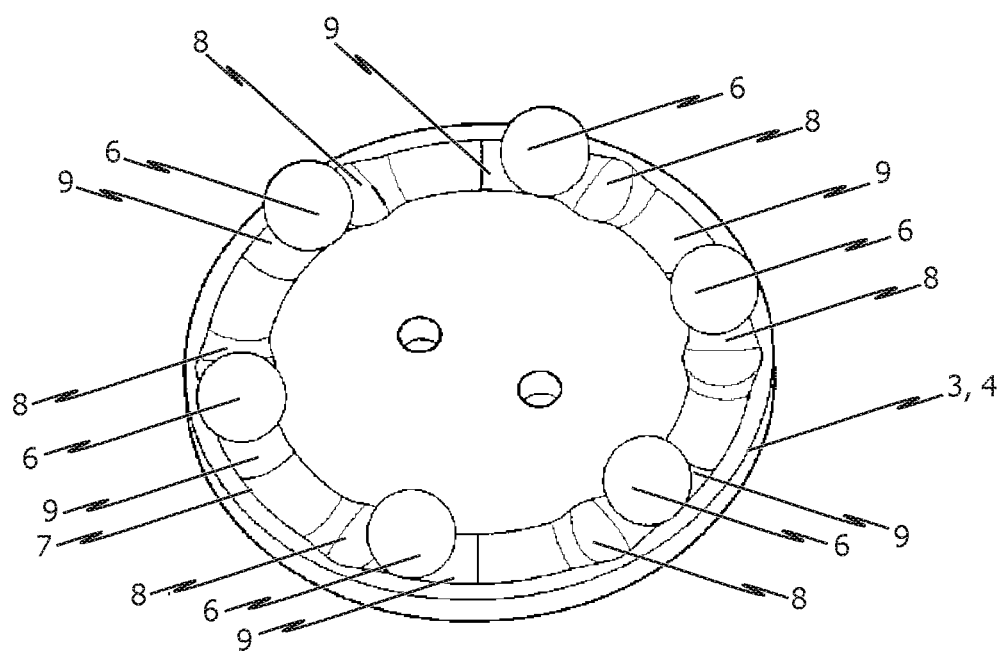
Figure 5:
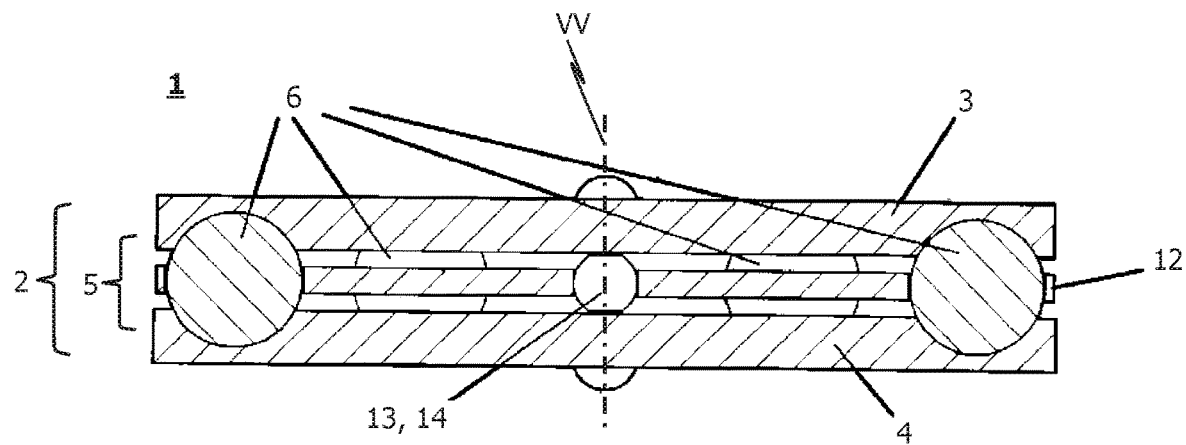
Figure 6:
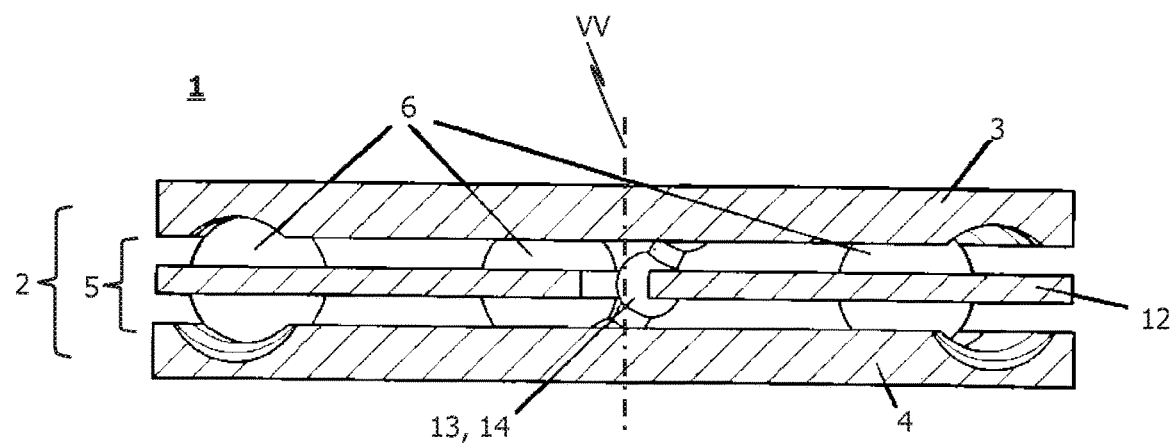
Figure 7:
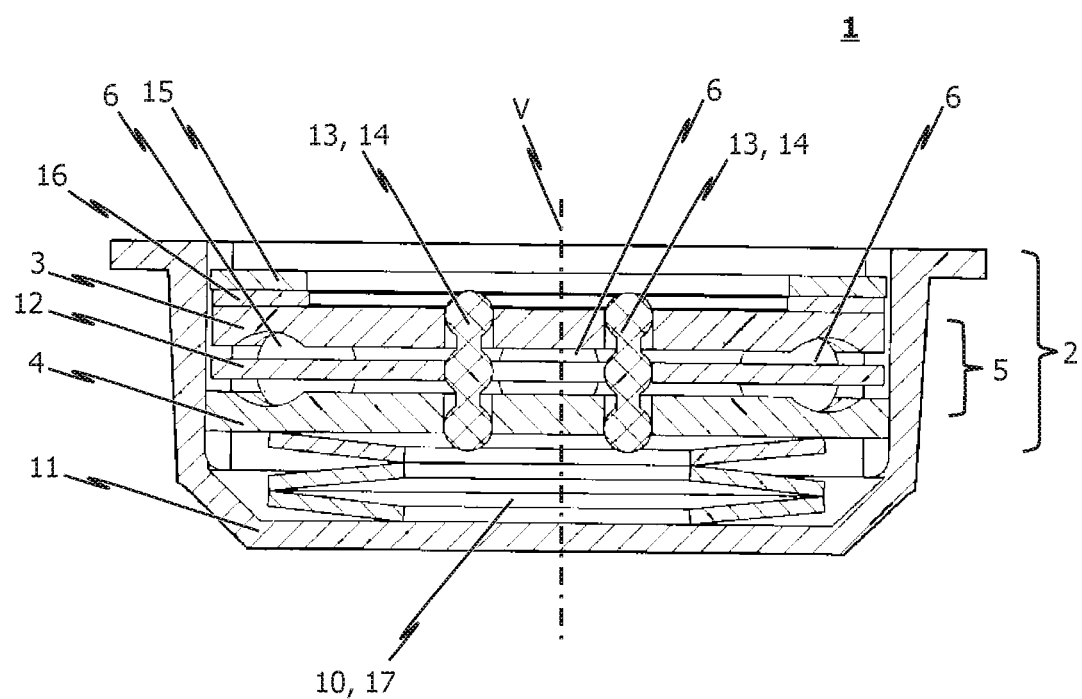
Figure 8:
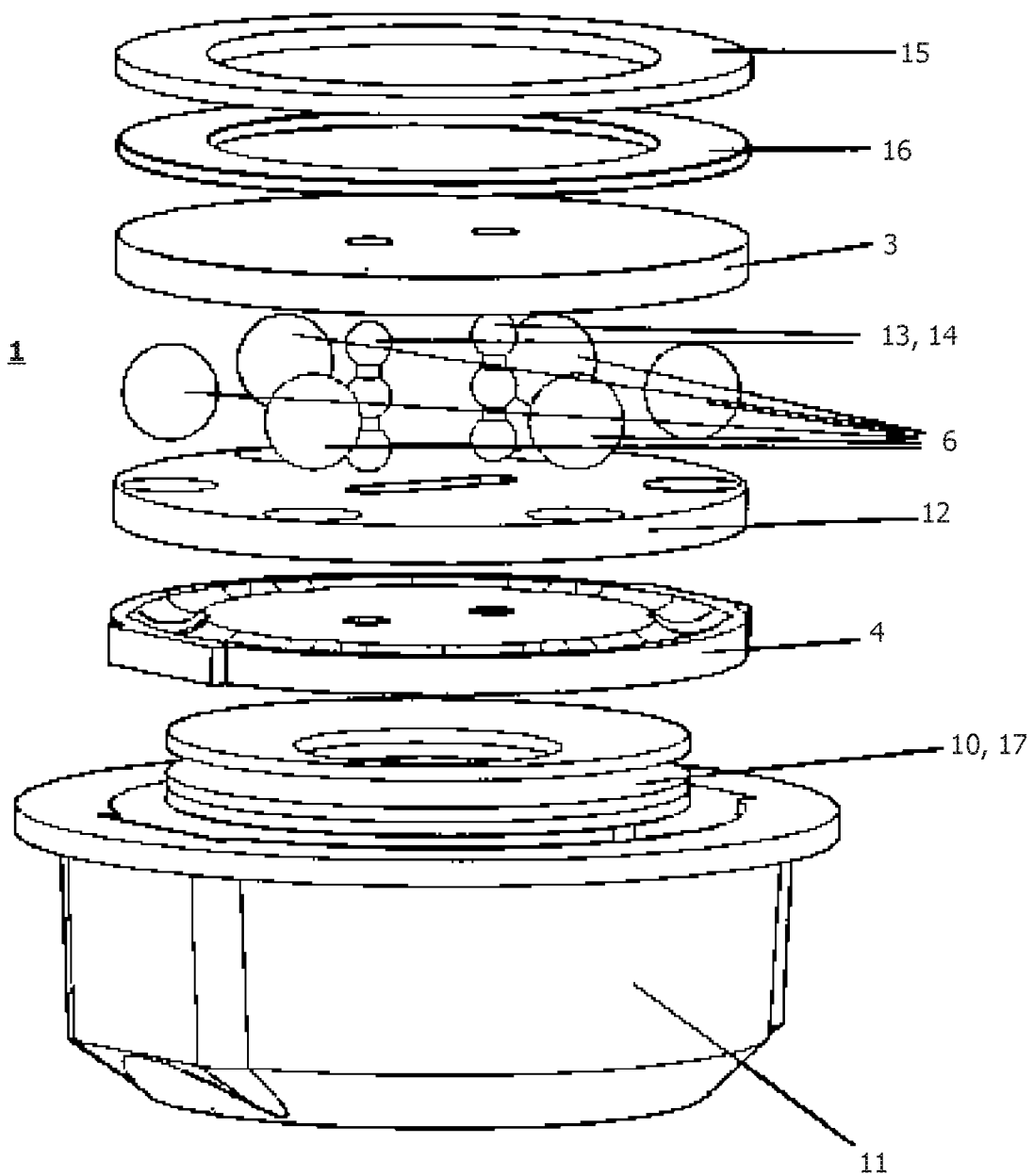
Figure 9:
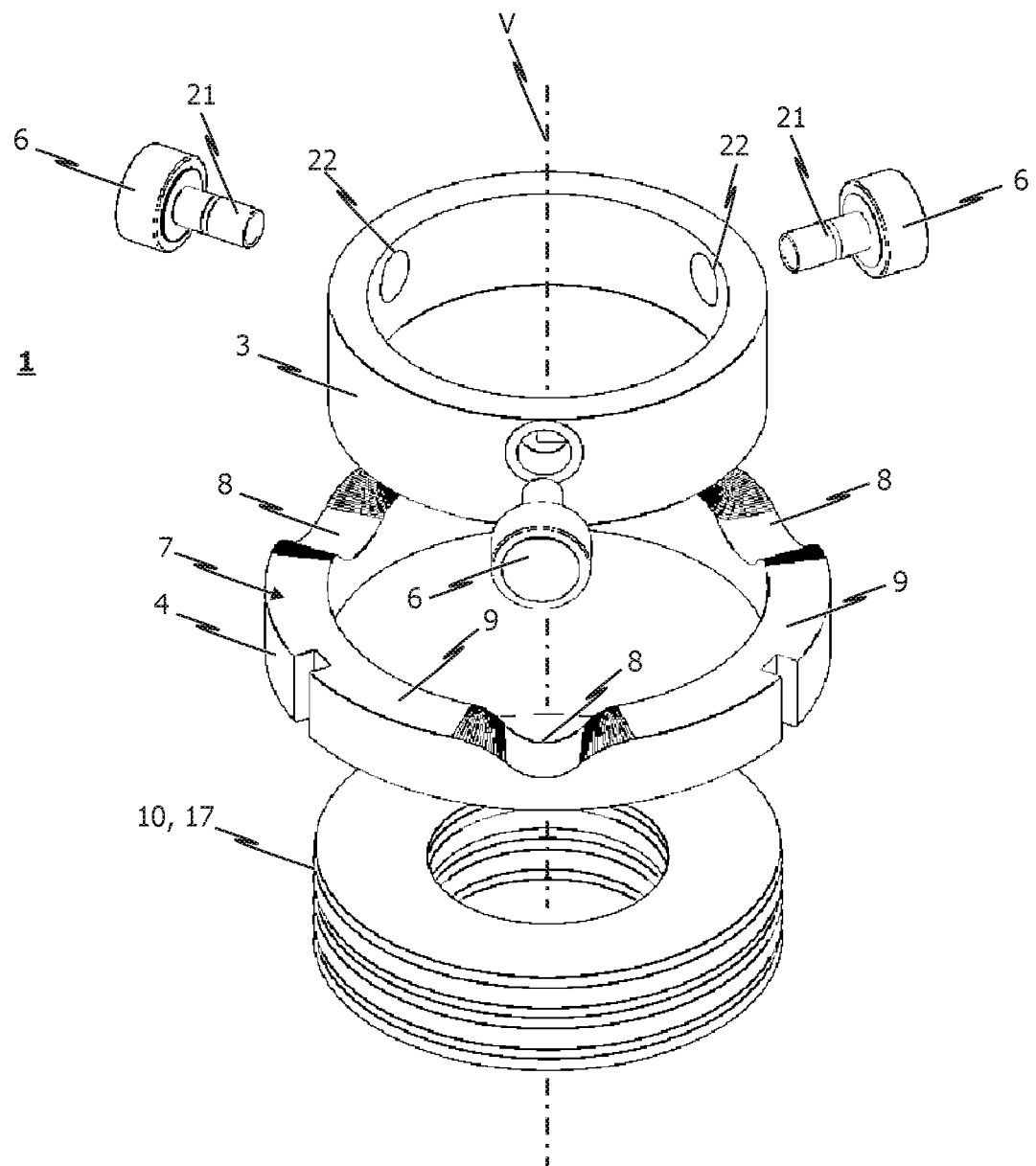
Figure 10:
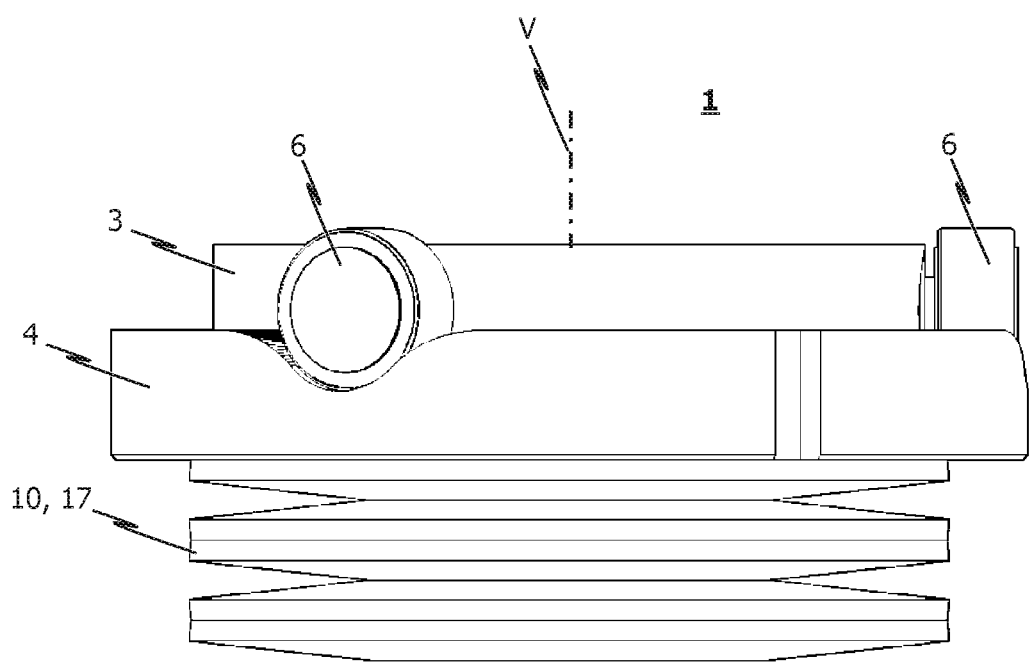

The drawings show:

FIG. 1A a schematic partly sectional side view of a conventional re-centering device;

FIG. 1B a schematic top view of the conventional re-centering device according to FIG. 1A;

FIG. 2 a schematic sectional view of a first exemplary embodiment of the inventive horizontal re-centering device with a thrust bearing device in its initial state;

FIG. 3 a schematic and isometric view of a bearing member of the embodiment according to FIG. 2 with corresponding rolling bodies;

FIG. 4 a schematic and isometric view of the bearing member according to FIG. 3 in a state in which the first bearing member is rotated around a vertical axis relative to a second bearing member of the thrust bearing device;

FIG. 5 a schematic and sectional view of a further exemplary embodiment of the inventive device for the horizontal re-centering of a coupling shaft which is not deflected with respect to the center reset;

FIG. 6 a schematic and sectional view of the exemplary embodiment according to FIG. 5 in a state in which a coupling shaft associated with the device is horizontally deflected relative to its center position;

FIG. 7 a schematic and sectional view of a further exemplary embodiment of the inventive device for the horizontal re-centering of a coupling shaft, wherein a coupling shaft associated with the device is not horizontally deflected relative to its center position;

FIG. 8 a schematic and isometric view of an exploded view of the inventive horizontal re-centering device according to the exemplary embodiment shown in FIG. 7;

FIG. 9 a schematic and isometric view of an exploded view of a further exemplary embodiment of the inventive horizontal re-centering device; and FIG. 10 a schematic and side view of the exemplary embodiment of the inventive device according to FIG. 9.

Before the solution according to the invention is specified with reference to the exemplary embodiments depicted in the drawings, the structure and functioning of a conventional and known prior art device for the horizontal re-centering of a coupling shaft should first be described.

To that end, FIGS. 1A and 1B schematically depict an exemplary embodiment of such a conventional horizontal re-centering device 100 as known from the prior art.

The conventional device 100 for the re-centering of a central buffer coupling pivotably fixed to a bearing block or similar linkage 102 of a track-guided vehicle by means of a coupling shaft 101 exhibits a guide 103 which follows the pivoting movement of the coupling shaft 101 around its vertical pivot axis and comprises thrust faces 104 arranged symmetrically to the longitudinal axis of the coupling shaft 101.

The coupling shaft 101 is articulated in a linkage housing 105 by means of vertically aligned bearing pins 106 and connected via same to the track-guided vehicle. Pressure means 107 are arranged in the linkage housing 105 which interact with the thrust faces 104 in effecting the horizontal re-centering. Each thrust face 104 is thereby associated with a pressure means 107.

In the embodiment according to FIGS. 1A and 1B, the guide 103 is configured as a cam disk which is rotatably supported in linkage housing 105 by means of vertically arranged bolt 108.

The cam disk (guide 103) is synchronously coupled to the coupling shaft 101 in terms of rotation and the bolt 108 is arranged axially aligned with the bearing pin 106 of the coupling shaft 102. The bolt 108 is operatively connected to the bearing pin 106 and the cam disk 103 is fixedly connected to a gear (not shown in FIGS. 1A and 1B) arranged beneath the cam disc (guide 103) which is connected and driven by a gear mechanism having an actuator, in particular by means of an electric motor.

The device for horizontal re-centering according to the depictions provided in FIG. 1A and FIG. 1B is designed to be permanently operative or be disabled or able to be disabled depending on pivot angle or able to be actuated by pneumatically, hydraulically or electrically operated actuating means. The actuating means in the example embodiment shown in FIGS. 1A and 1B is designed as a remotely controllable actuator, wherein the cam disk (guide 103) and the coupled coupling shaft 101 operatively connected thereto can by means of same be positioned via the re-centering device 100 into any position of the designated horizontal pivoting range of the coupling shaft 101 in the power flow.

Due to the structure of the horizontal re-centering device 100 known from the prior art, in particular with pressure means 107, the device 100 is relatively complex and in particular takes up a relatively large amount of space.

A clearly more compact solution can be realized with the invention, which is to be described in greater detail below on the basis of exemplary embodiments.

Specifically, according to one aspect of the present invention, it is particularly provided for the device 1 for horizontal re-centering to comprise a first rotating body 3 and a second rotating body 4 at a spacing from the first rotating body 3 and which is rotatable relative to the first rotating body 3, wherein the device 1 is designed to produce the force necessary to generate a restoring torque acting on the coupling shaft by rotating the two rotating bodies 3, 4 relative to each other.

According to a further aspect of the present invention, it is provided for the horizontal re-centering device 1 to comprise a first rotating body 3 and a second rotating body 4 which is rotatable relative to the first rotating body 3, wherein the device 1 is designed to produce the force necessary to generate a restoring torque acting on the coupling shaft by rotating the two rotating bodies 3, 4 relative to each other. In this further aspect of the present invention, it is particularly provided for the first and second rotating body 3, 4 to each be at least partly of circular cylindrical configuration and be coaxially arranged with one another such that the first rotating body 3 is at least partially accommodated by the second rotating body 4.

It is thus conceivable to integrate the device 1 for generating a restoring torque into an axial bearing, via which the coupling shaft is supported so as to be horizontally pivotable relative to a supporting structure 11.

In principle—compared to the conventional solutions known from the prior art—the inventive solution is able to significantly reduce the space necessary for realizing the re-centering function. The more compact structure additionally allows a significant weight reduction as well as a reduction of components, which in turn minimizes maintenance needs.

As will be described in greater detail below with reference to the representations provided in FIG. 2 to FIG. 10, the invention is thereby based on the realization that a clearly more compact structure for a horizontal re-centering device can be realized if the force needed to generate the restoring torque required for the re-centering of the coupling shaft is not produced in the plane in which it can directly effect a torque but rather a corresponding source of force be more advantageously arranged, and in particular within the axial bearing, and the force redirected accordingly.

According to certain exemplary embodiments of the inventive device for horizontal re-centering as described in detail in the following, it is provided for the rotating bodies 3, 4 to be provided as "cam disks" having corresponding crests and troughs so that the rolling bodies of a rolling body arrangement can utilize the rising and falling of the rotating bodies 3, 4 configured as cam disks to realize a rotational movement or to generate a required torque for the re-centering respectively.

As an example, in the exemplary embodiment of the inventive device 1 depicted schematically in FIG. 2 for the horizontal re-centering of a (not shown) coupling shaft, the device 1 comprises a first (here: upper) rotating body 3 as well as a second (here: lower) rotating body 4 vertically spaced from said first rotating body 3. The two rotating bodies 3, 4 are in particular each realized as bearing disks in the exemplary embodiment according to FIG. 2.

A rolling body arrangement 5 having at least one rolling body 6 and preferably a plurality of rolling bodies 6 is moreover provided.

In the exemplary embodiments of the inventive horizontal re-centering device 1 depicted in the drawings, the individual rolling bodies 6 are each of at least substantially spherical configuration. However, rolling bodies 6 of, for example, cylindrical or frustoconical shape are also conceivable. Asymmetrically shaped rolling bodies 6 are in principle also conceivable.

FIG. 3 shows a schematic and isometric view of the lower rotating body 4 with rolling bodies 6 as employed in the device 1 depicted in FIG. 2, and here in a state in which the device 1 is in its initial state. This initial state relates to a state of the device 1 in which the rolling body arrangement 5, or respectively the rotating bodies 3, 4 (bearing disks) associated with the rolling body arrangement 5, are not rotated relative to each other about a vertical axis V of the thrust bearing device 2.

When the re-centering device 1 is integrated into an axial bearing 2, via which the coupling shaft is mounted to the vehicle body of a track-guided vehicle so as to be pivotable in the horizontal plane, said initial state corresponds to the center position of the coupling shaft pivotably supported by the thrust bearing device 2.

In contrast thereto, FIG. 4 schematically depicts a situation in which the device 1 according to FIG. 2 is rotated; i.e. no longer in its initial state as per FIG. 3. In detail, FIG. 4 shows a schematic and isometric representation of the lower rotating body 4 (bearing disk) of the device 1 according to FIG. 2, and here in a state in which the second rotating body 4 is rotated around the previously cited vertical axis V relative to the first (upper) rotating body 3 (not shown in FIG. 4).

As can be seen from the representations in FIG. 3 and FIG. 4, this exemplary embodiment provides for at least the lower rotating body 4 to comprise a race 7 which can in particular be configured as a groove. The race 7 serves to at least partially guide the rolling bodies 6 when the first rotating body 3 rotates around the cited vertical axis V relative to the second rotating body 4.

It is inventively provided for the race 7 of the first and/or second rotating body 3, 4 and the rolling bodies 6 cooperate to at least some extent such that a vertical distance between the rotating bodies 3, 4 varies upon a rotation of the first rotating body 3 relative to the second rotating body 4. In particular, the race(s) 7 in the first and/or second rotating body 3, 4 and the rolling bodies 6 in the exemplary embodiment depicted schematically in FIG. 2 at least partly interact such that there is at least an increase in the vertical distance between the rotating bodies 3, 4 when, starting from an initial state of the device 1 (cf. FIG. 2 and FIG. 3); i.e. a state in which the rotating bodies 3, 4 are not rotated relative to each other, the rotating bodies 3, 4 are at least rotated by a predefined or definable angular amount relative one another.

As can be seen from viewing FIG. 3 and FIG. 4 together, at least the race 7 configured in the lower bearing member 4 in this exemplary embodiment comprises first regions 8 having a first race depth and further second regions 9 having a second race depth, wherein the depth of the first race is greater than the depth of the second race, and wherein the depth of the race preferably steadily transitions from the first race depth to the second race depth in a transition region between the first region 8 and the second region 9. In the initial state of thrust bearing device 2, it is provided—as can particularly be seen from the isometric depiction in FIG. 3—for the rolling bodies 6 to be at least partly arranged in the respective regions 8 of the race 7.

When the device 1 then leaves its initial state; i.e. when the second rotating body 4 rotates about vertical axis V relative to rotating body 3, the rolling bodies 6 are forced to leave the first region 8 of the race 7 in the direction of an adjacent second region 9 of the race 7, which necessarily causes the vertical distance between the first and second rotating body 3, 4 to increase.

In order to prevent up and down movement of a coupling shaft rotationally fixed to the first rotating body 3—as will be explained in greater detail subsequently with reference to the representations in FIG. 7 and FIG. 8—a pressurized or pressurizable punch assembly 10 associated with the second rotating body 4 is allocated which is supported on a supporting structure 11 and via which a normal force acting in the direction of the first rotating body 3 can be introduced into the second rotating body 4. It is thereby provided for the coupling shaft to be at least substantially fixed rotationally to the first rotating body 3, whereby although the first rotating body 3 is rotatable about the vertical axis V relative to the supporting structure 11, it is not or at least not substantially mounted so as to be vertically movable relative to the supporting structure 11.

On the other hand, although the second rotating body 4 is vertically movable relative to the supporting structure 11, it is not or at least not substantially mounted so as to be horizontally movable relative to the supporting structure 11.

Returning to the exemplary embodiment of the inventive re-centering device 1 depicted in a schematic sectional view in FIG. 2, it can be noted that this device 1 makes use of a cage structure 12 allocated to the rolling bodies 6 of the rolling body arrangement 5 and which serves to forcibly guide the rolling bodies 6 of the rolling body arrangement 5 when the first rotating body 3 is rotated about the vertical axis V relative to the second rotating body 4.

In structural and functional terms, the further exemplary embodiment of the inventive horizontal re-centering device 1 shown in schematic sectional view in FIG. 5 substantially corresponds to the embodiment described above with reference to the FIG. 2 to FIG. 4 representations but wherein the embodiment according to FIG. 5 makes further use of a guide structure 13 serving to guide and/or limit a movement of the cage structure 12 relative to the first and second rotating body 3, 4.

The guide structure 13 is to provide a steady guiding of the cage structure 12 with rolling bodies 6—always at half the angular velocity—between the rotating bodies 3, 4. This is to thereby ensure that the rolling bodies 6 leave and/or fall back into the grooves/races 7 of the two rotating bodies 3, 4 uniformly (e.g. in cases of different degrees of friction/lubrication).

In detail, the guide structure 13 in this exemplary embodiment comprises—as a consolidated view of FIG. 5 and FIG. 6 together shows—at least one guide body 14 which is arranged eccentrically relative to the vertical axis V and connects the two rotating bodies 3, 4 together. It is thereby particularly provided for the at least one guide body 14 to be supported so as to be rotationally movable relative to the first rotating body 3 and the second rotating body 4.

The guide body 14 is specifically arranged concentric with the axis of the guide structure 13. In dead center position, said axis is parallel to the vertical axis V albeit positioned eccentrically thereto.

A further example embodiment variant of the inventive device 1 for re-centering is shown in a schematic sectional view in FIG. 7. The device 1 is thereby in its initial state. FIG. 8 shows a schematic exploded representation of the exemplary embodiment according to FIG. 7.

As depicted, the exemplary embodiment according to FIG. 7 and FIG. 8 comprises a thrust bearing device 2 having a first bearing member 3 in the form of a bearing disk as well as a further second bearing member 3 (likewise in the form of a bearing disk), whereby the two rotating bodies 3, 4 are vertically spaced from one another. A plurality of rolling bodies 6 (here: spherical rolling bodies 6) are arranged between the bearing members 3, 4 as is common in a traditionally conventional thrust bearing arrangement. The rolling bodies 6 may be allocated a cage structure 12 so that their spacing is defined relative to each other and a forced guiding of the rolling bodies 6 occurs when the two rotating bodies 3, 4 are rotated relative to each other and around a vertical axis V of the thrust bearing device 2.

Furthermore, a respective race 7 is preferably provided in both of the bearing members 3, 4 which likewise serves in guiding the rolling bodies 6 upon a rotation of the two rotating bodies 3, 4 relative to each other. The races 7 are—as described above with reference to the depictions in FIG. 3 and FIG. 4—provided with different regions 8, 9 which differ by their race depth.

In an initial state of the thrust bearing device 2, preferably all of the rolling bodies 6 are respectively situated in a (first) region 8 of the race 7 in which the depth of the race is the greatest.

When the second rotating body 4 is thus rotated relative to the first rotating body 3 about vertical axis V, the rolling bodies 6 have to pass out of the first race region 8 into an adjacent second race region 9 of lesser race depth than the first race region 8 so that a vertical distance between the rotating bodies 3, 4 will necessarily increase.

On the other hand, it is provided in the exemplary embodiment of the inventive horizontal re-centering device 1 depicted schematically in FIG. 7 and FIG. 8 for the second rotating body 4 to be of non-rotatable or at least substantially non-rotatable mounting relative to a supporting structure 11 (here: thrust bearing housing). This mounting can for example be realized—as can be seen for example in the FIG. 8 depiction—by a corresponding snap-lock connection formed between the second rotating body 4 and the supporting structure 11.

Then again, the second rotating body 4 is supported in the supporting structure 11 such that said second rotating body 4 can move vertically—at least over a certain area—relative to the supporting structure 11 (here: thrust bearing housing).

In contrast thereto, the first rotating body 3 is supported relative the supporting structure 11 such that vertical movement relative to the supporting structure 11 is not possible. To that end, a corresponding cap and preferably also a sliding disk 16 arranged between the cap 15 and the first rotating body 3 is utilized in the exemplary embodiment depicted schematically in FIG. 7 and FIG. 8.

Yet the first rotating body 3 is not mounted rotationally fixed relative to the supporting structure but rather can be accordingly rotated in the horizontal plane. A coupling shaft (not shown in FIG. 7 and FIG. 8) is at least indirectly connected to the first rotating body 3.

Further to be recognized from the FIG. 7 and FIG. 8 representation is the providing of a pressurized or pressurizable punch assembly 10 associated with the second rotating body 4 and supported against the supporting structure 11. By means of said pressurized or pressurizable punch assembly 10, a normal force acting in the direction of the first rotating body 3 can be introduced into the second rotating body 4.

Although FIG. 7 and FIG. 8 suggest that the pressurized punch assembly 10 comprises corresponding springs 17 such as, for example, plate springs, this implementation is however not to be regarded as limiting. Rather, it is advantageous for the punch assembly 10 to be configured such that an amount of normal force introduced into the second rotating body 4 by said punch assembly 10 can be adjusted so as to thereby also disable re-centering if necessary. Insofar, providing a hydraulically or pneumatically operated punch assembly 10 thus also makes sense in this context.

Lastly, the embodiment depicted schematically in FIG. 7 and FIG. 8 also makes use of a guide structure 13, as was already described above with reference to the FIGS. 5 and 6 depictions.

Briefly summarized, the function of the device 1 according to the invention for horizontal re-centering is as follows:
a force acts upon the first or second rotating body 3, 4 (for example the lower rotating body 4) of the two rotating bodies, whereby said rotating body is supported in rotationally fixed manner in a supporting structure 11 so as to be able to move up and down vertically while the other of the two rotating bodies is always pressed against a cap 15 or against a sliding disk 16 respectively so that the rotating body cannot move up and down although can rotate;
a coupling shaft is rotationally fixed to the upper rotating body 3; and
preferably both rotating bodies 3, 4 have races 7 in which corresponding pockets (first regions 8) are provided, wherein the geometry of the races 7 together with the rolling motion of the rolling bodies 6 on the races 7 converts the acting normal force into a tangential force which is used to generate a restoring torque.

The races 7 are realized such that:
in the center position, the rolling bodies 6 are each situated in a trough (first region 8); i.e. in an area of greater race depth;
the rolling bodies 6 must overcome a relatively large gradient at lesser deflections and thus generate a high tangential force;
as of a certain deflection, the rolling bodies 6 are at a plateau (second region 9) and thus generate no tangential force and no restoring torque.

The rolling bodies 6 are preferably forcibly guided by a cage structure 12 so as to always remain at the same distance to one another.

The following will reference the representations provided in FIG. 9 and FIG. 10 in describing a further embodiment of the inventive device 1 for the horizontal re-centering of a coupling shaft (not shown in FIG. 9 and FIG. 10), in particular a central buffer coupling of a track-guided vehicle.

As also in the embodiments according to FIGS. 2 to 8, the further exemplary embodiment according to FIGS. 9 and 10 provides for the device 1 to comprise a first rotating body 3 and a second rotating body 4 which is able to rotate relative to the first rotating body 3.

In contrast to the previously described exemplary embodiments of the present invention, however, in the embodiment according to FIGS. 9 and 10, the two rotating bodies 3, 4 are not actually arranged at a vertically spacing from one another. Instead, in the embodiment according to FIGS. 9 and 10, at least the second rotating body 4 is at least partly of circular cylindrical configuration. The two rotating bodies 3, 4 are thereby arranged coaxially with each other in such a manner that at least part of the first rotating body 3 is accommodated by the second rotating body 4.

Instead of a circular cylindrical configuration to the rotating bodies 3, 4, it is also conceivable for the rotating bodies to be of at least partly ring-like or annular configuration, particularly circularly annular.

As can be seen from the FIG. 9 representation, a cam roller system having a plurality of cam rollers 6 is further employed in this embodiment. The cam rollers 6 thereby serve as corresponding rolling bodies. It is thereby particularly preferentially preferred for the cam roller system to comprise exactly three cam rollers in order to ensure a corresponding 3-point bearing, wherein this in particular prevents the system consisting of the two rotating bodies 3, 4 from wobbling and thus being unevenly loaded.

As indicated schematically in FIG. 9, the preferably three cam rollers 6 are in particular arranged at an equidistant relationship to one another.

The cam rollers 6 are rotatably supported by the first rotating body 3 and radially project from said first rotating body 3.

It is conceivable in this context for each cam roller 6 to exhibit a corresponding particularly pin-shaped cam roller shaft 21 which is rotatably supported in a mounting 22 provided in the first rotating body 3.

The mounting of the cam rollers 6 in particular ensues such that they radially project from the first rotating body 3 and bear on the upper face of the second rotating body 4 in the assembled state of the device 1 (cf. FIG. 10), and in such a manner that the two rotating bodies 3, 4 can be rotated about a vertical axis V relative to each other via the cam rollers 6 of the cam roller system.

In so doing, the (upper) face of the second rotating body 4 serves as a race 7 for the cam rollers 6 of the cam roller system.

It is thereby in particular provided for the race 7 and the cam rollers 6 to cooperate to at least some extent such that upon the first rotating body 3 rotating relative to the second rotating body 4, the first rotating body 3 is moved along the vertical axis V relative to the second rotating body 4.

Specifically, in particular provided in the embodiment of the inventive device 1 depicted schematically in FIGS. 9 and 10 is for the race 7 and the cam rollers 6 of the cam roller system to cooperate to at least some extent such that the first rotating body 3 moves at least partly out of the second body 4 along the vertical axis V relative to said second body 4 when, starting from an initial state of the device 1 shown as an example in FIG. 10, in which the two rotating bodies 3, 4 are not rotated relative each other, the rotating bodies 3, 4 are rotated relative each other at least by a predefined or definable angular amount.

In order to realize this, it is conceivable for the race; i.e. the (upper) face of the second rotating body 4, on which the cam rollers 6 of the cam roller system rest, to comprise first regions 8 of at least partially a first race depth and further second regions 9 of at least partially a second race depth, wherein—as evident for example in FIG. 9—the first race depth is greater than the second race depth and wherein in a transition region between a first region 8 and a second region 9, the depth of race 7 preferably steadily transitions from the first race depth to the second race depth.

Although not depicted in FIGS. 9 and 10, it is of advantage for the coupling shaft, for example an automatic central buffer coupling of a track-guided vehicle, to be at least substantially rotationally fixed to the first rotating body 3, wherein while the first rotating body 3 is rotatable about the vertical axis V relative to a supporting structure (not shown in FIGS. 9 and 10), it is not or at least not substantially mounted so as to be vertically movable relative to the supporting structure.

On the other hand, it is advantageous for the second rotating body 4 to be vertically movable relative to the supporting structure albeit to not or at least not substantially be mounted so as to be horizontally rotatable relative to the supporting structure.

As depicted in FIGS. 9 and 10, the second rotating body 4 is allocated a pressurized or pressurizable punch assembly 10 supported against a (not shown) supporting structure, by means of which a normal force acting in the direction of the first rotating body 3 is introduced into the second rotating body 4.

As is also the case in the embodiments of the inventive device 1 previously described with reference to the FIGS. 2 to 8 representations, the basic principle of a race with "peaks and valleys" is maintained in the further embodiment according to the FIGS. 9 and 10 representations, whereby the restoring torque required for the re-centering is furthermore generated by a gradient in the race in combination with a normal force acting on the race.

Yet no balls are employed as rolling bodies in the embodiment depicted schematically in FIGS. 9 and 10 but rather rollers, in particular cam rollers, which is coupled with the following additional advantages:

- due to its cylindrical form and the resulting linear contact between the cam rollers 6 and the race 7, the surface pressure in this pairing is generally lower which—compared to the embodiments according to FIGS. 2 to 8—enables using fewer rolling bodies (cam rollers) at a similar diameter;
- it is in particular possible to only use a total of three rolling bodies (cam rollers) such that a wobbling of the system and thus an uneven loading is in particular precluded;
- the cylindrical form to the cam rollers additionally simplifies the producing of the race; it can then be created by a simple cylindrical milling tool or the like;
- the cam rollers have a pin-based mounting option; they can thus be fixedly connected to the first rotating body 3 and consequently not require complicated guiding by means of a cage or similar structure; and
- high forces can be conducted by means of the cam rollers and their fixation (bearing on the first rotating body 3), thereby making a further second race—as in the case of the embodiments according to FIGS. 2 to 8—redundant such that the first rotating body, representing the structural member accommodating the cam rollers, can thus transmit the generated restoring torque to the coupling shaft.

Although not depicted in FIGS. 9 and 10, it is further expedient for the device 1 to be arranged in a housing serving as a supporting structure which absorbs the counter (reaction) force of the pressurized or pressurizable punch assembly 10.

The first rotating body 3 preferably lies on the rotational axis of the coupling shaft to be reset. The rotational motion of the coupling shaft is thereby trans-mitted to the first rotating body 3. The first rotating body 3 is fixed in height.

Due to the rotational movement, the cam rollers 6 fixed to the first rotating body 3 cause an up and down movement of the second rotating body 4, same being secured to the housing serving as supporting structure against rotation. A force is exerted on the race—as in the embodiments previously described—by the pressurized or pressurizable punch assembly 10.

The height of the first rotating body 3 is preferably fixed by the first rotating body 3 being directly held at the respective height in the housing by sliding elements and a corresponding housing construction (e.g. by a cap). This has the advantage of the entire horizontal re-centering device 1 being able to be fit and/or removed as a single component.

The invention is not limited to the exemplary embodiments but rather yields from an integrated overall consideration of all the aspects disclosed herein.

It is for example particularly also conceivable for the races of the bearing members to provide further functions such as e.g. intermediary arresters or limit stops.

What is claimed is:

1. A device for a horizontal re-centering of a coupling shaft that is a central buffer coupling of a track-guided vehicle, the device comprising:
    a first rotating body; and
    a second rotating body that is rotatable relative to the first rotating body,
        wherein the device is configured to produce a force necessary to generate a restoring torque acting on the coupling shaft based on a rotating of the first rotating body and the second rotating body relative to each other, and
        wherein at least parts of the first rotating body and second rotating body are of a circular cylindrical configuration and are coaxially arranged with one another thereby causing the first rotating body to be at least partially accommodated by the second rotating body; and
    a cam roller system having at least two cam rollers that are rotatably supported by the first rotating body and radially project from the first rotating body and rest on a face of the second rotating body, wherein the first rotating body and the second rotating body rotate relative to each other about a vertical axis (V) via the at least two cam rollers of the cam roller system.

2. The device according to claim 1,
    wherein the first rotating body and the second rotating body are components of a thrust bearing device, and wherein the thrust bearing device is configured to generate a torque to act on the coupling shaft.

3. The device according to claim 2,
    wherein the thrust bearing device is configured to support the coupling shaft, wherein the thrust bearing device is horizontally pivotable relative to a supporting structure.

4. The device according to claim 1,
    wherein the device is configured to generate a torque acting on the coupling shaft at least when the coupling shaft is horizontally deflected relative to a fixed or definable center position.

5. The device according to claim 1,
    wherein the face of the second rotating body is configured to be a race for the at least two cam rollers of the cam roller system, wherein the race and the at least two cam rollers are configured to cooperate, wherein upon a rotating of the first rotating body relative to the second rotating body the first rotating body is moved along the V relative to the second rotating body.

6. The device according to claim 5,
wherein the race and the at least two cam rollers cooperate, wherein the first rotating body is at least partially moved out of the second rotating body along the V relative to the second rotating body when, starting from an initial state of the device when the first rotating body and the second rotating body are not rotated relative to each other, the first rotating body and the second rotating body are at least rotated relative to each other by a predefined or a definable angular amount.

7. The device according to claim 6,
wherein the race comprises first regions having a first race depth in at least some first areas and wherein the race further comprises second regions having a second race depth in at least some second areas, wherein the first race depth is greater than the second race depth, and wherein a race depth of the race transitions from the first race depth to the second race depth in a transition region between the first regions and the second regions.

8. The device according to claim 7,
wherein the at least two cam rollers include a first cam roller and a second cam roller that are arranged at least partly in a first selected region of the race in the initial state of the device.

9. The device according to claim 1,
wherein the second rotating body is arranged at a spacing from the first rotating body,
wherein the first rotating body is configured as a first bearing member in a form of a first bearing disk,
wherein the second rotating body is configured as a second bearing member in a form of a second bearing disk, and wherein the device further comprising:
a rolling body arrangement having at least one rolling body that is partially arranged between the first rotating body and the second rotating body, wherein the first rotating body and the second rotating body rotate relative to one another around the V via the at least one rolling body.

10. The device according to claim 9,
wherein a race, in a form of a groove, is provided in the first rotating body and/or in the second rotating body to at least partially guide the at least one rolling body about the V relative to the second rotating body upon a rotation of the first rotating body.

11. The device according to claim 10,
wherein the race and the at least one rolling body cooperate, wherein a vertical distance between the first rotating body and the second rotating body varies upon a rotation of the first rotating body relative to the second rotating body.

12. The device according to claim 10,
wherein the race and the at least one rolling body cooperate, wherein a vertical distance between the first rotating body and the second rotating body increases when, starting from an initial state of the device when the first rotating body and the second rotating body are not rotated relative to each other, the first rotating body and the second rotating body are rotated at least by a predefined or definable angular amount.

13. The device according to claim 10,
wherein the race comprises at least one first region having a first race depth in at least some first areas and wherein the race further comprises at least one second region having a second race depth in at least some second areas, wherein the first race depth is greater than the second race depth, and wherein a race depth of the race transitions from the first race depth to the second race depth in a transition region between the at least one first region and the at least one second region.

14. The device according to claim 13,
wherein the at least one rolling body is at least partly arranged in the at least one first region of the race in the initial state of the device.

15. The device according to claim 1,
wherein the coupling shaft is at least substantially rotationally fixed to the first rotating body, and wherein although the first rotating body is rotatable about the V relative a supporting structure, the first rotating body is not or at least not substantially mounted so as to be vertically movable relative to the supporting structure.

16. The device according to claim 15,
wherein the second rotating body is vertically movable relative the supporting structure but the second rotating body is not or at least not substantially mounted so as to be horizontally rotatable relative to the supporting structure.

17. The device according to claim 15,
wherein the second rotating body is associated with a pressurized or pressurizable punch assembly supported on the supporting structure, wherein a normal force acting in a direction of the first rotating body is introduced into the second rotating body via the pressurized or pressurizable punch assembly.

18. The device according to claim 17,
wherein an amount of normal force introduced into the second rotating body via said punch assembly is regulated.

19. A device for a horizontal re-centering of a coupling shaft that is a central buffer coupling of a track-guided vehicle, the device comprising:
a first rotating body; and
a second rotating body that is rotatable relative to the first rotating body,
wherein
(1) the device is configured to produce a force necessary to generate a restoring torque acting on the coupling shaft based on a rotating of the first rotating body and the second rotating body relative to each other,
(2) the second rotating body is arranged at a spacing from the first rotating body, and
(3) the first rotating bods is configured as a first bearing member in a form of a first bearing disk and the second rotating body is configured as a second bearing member in a form of a second bearing disk,
wherein the device further comprising:
a rolling body arrangement having at least one rolling body that is partially arranged between the first rotating body and the second rotating body, wherein the first rotating body and the second rotating body rotate relative to one another around a vertical axis (V) via the at least one rolling body, wherein the rolling body arrangement comprises at least two rolling bodies and a cage structure allocated to the at least two rolling bodies for a forced guiding of the at least two rolling bodies.

20. The device according to claim 19,
wherein a guide structure is configured for guiding and/or limiting a movement of the cage structure relative to the first rotating body and the second rotating body.

21. The device according to claim 20,
wherein the guide structure comprises at least one guide body which is eccentrically arranged relative to the V and connects the first rotating body and the second rotating body together.

22. The device according to claim 21,
wherein the guide body is supported so as to be rotationally movable relative to the first rotating body and/or relative to the second rotating body.

* * * * *

UNITED STATES PATENT AND TRADEMARK OFFICE
CERTIFICATE OF CORRECTION

PATENT NO. : 11,370,466 B2
APPLICATION NO. : 16/344683
DATED : June 28, 2022
INVENTOR(S) : Ralf Schipmann et al.

It is certified that error appears in the above-identified patent and that said Letters Patent is hereby corrected as shown below:

In the Claims

Claim 19
Column 16, Line 49 should read:
"(3) the first rotating body is configured as a first bearing"

Signed and Sealed this
Twenty-fifth Day of June, 2024

Katherine Kelly Vidal
*Director of the United States Patent and Trademark Office*